United States Patent Office 2,724,709
Patented Nov. 22, 1955

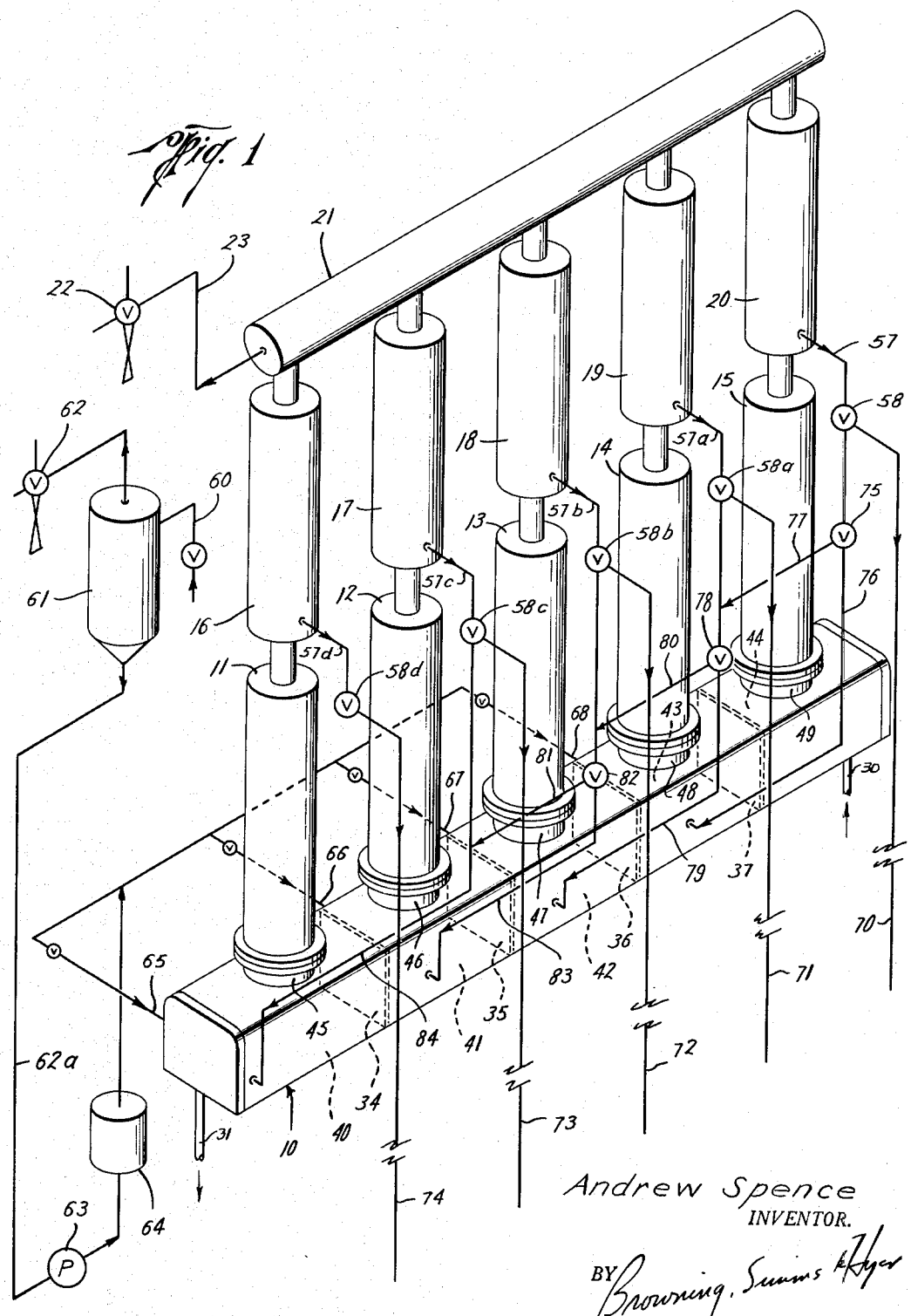

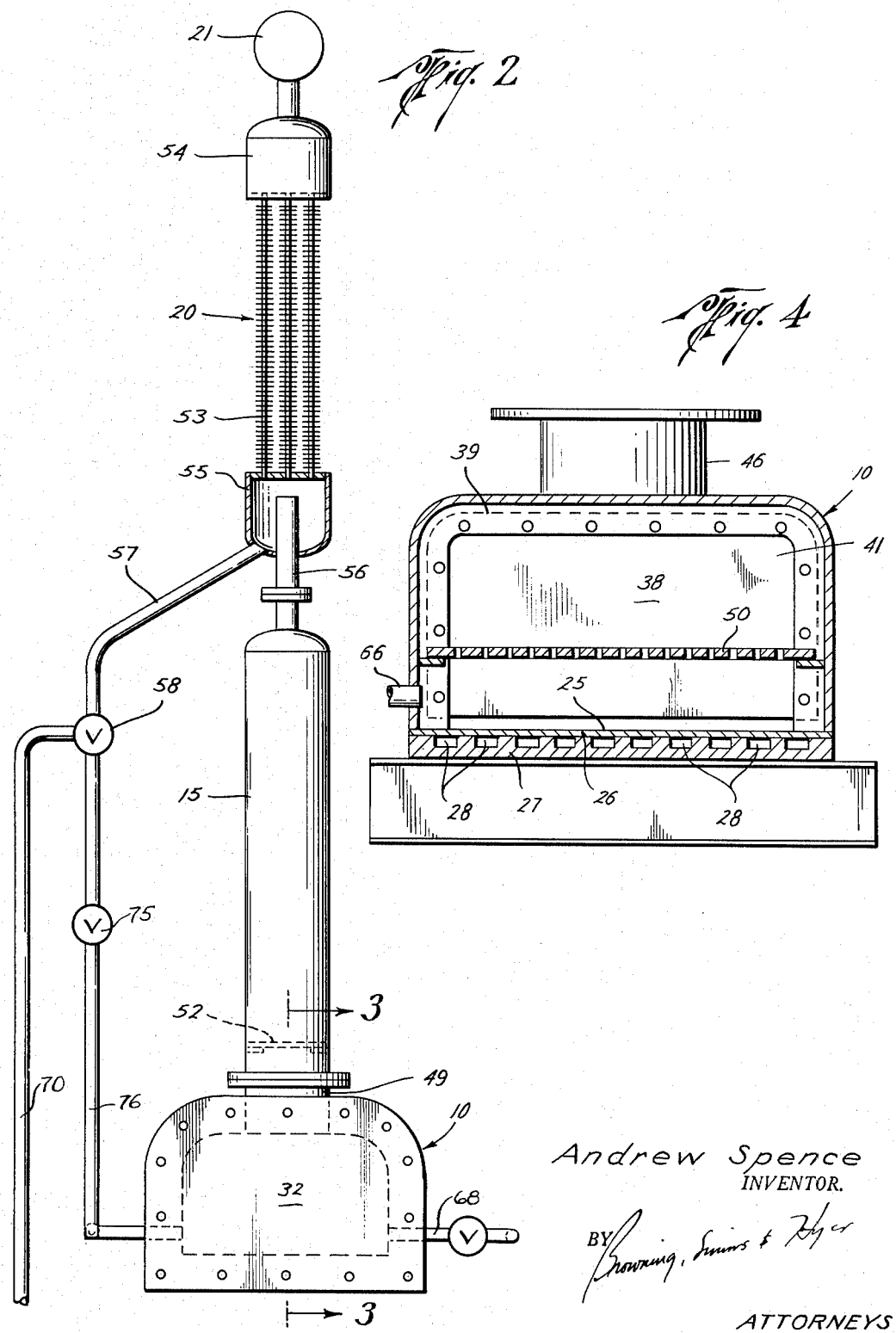

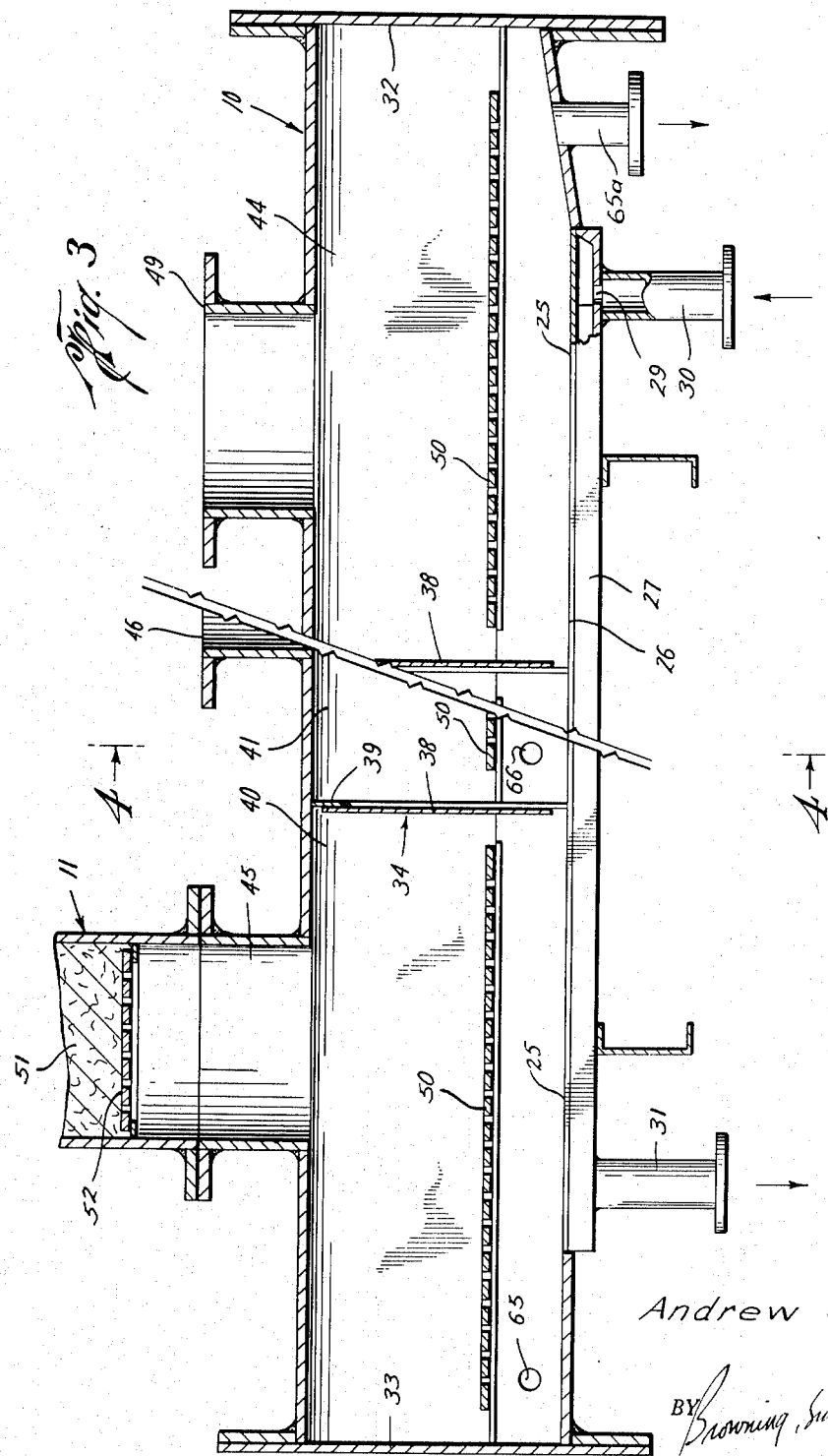

2,724,709

VACUUM FRACTIONAL DISTILLATION OF TALL OIL AND DISTILLATION APPARATUS

Andrew Spence, Houston, Tex.

Application April 29, 1954, Serial No. 429,775

17 Claims. (Cl. 260—97.6)

This invention relates to an improved process for fractionally distilling tall oils and particularly to a process for producing a rosin acid fraction substantially devoid of fatty acids and unsaponifiable compounds. In one of its aspects, it relates to an improved rectification or fractional distillation apparatus particularly adapted for use under a high vacuum in the fractionation of tall oils and other substances.

Depending on its source, tall oil contains from about 35 to 65 per cent rosin acids, 25 to 60 per cent fatty acids, and 5 to 30 per cent unsaponifiable compounds. While such crude tall oil has in itself found some limited usages, many attempts have been made in the past to separate it into its individual components, particularly into substantially pure fatty and rosin acid fractions so that the latter could become competitive with fatty acids and rosin acids derived from other sources. In performing such a separation, it has been the almost universal commercial practice in the past to employ steam distillation of the tall oil to separate it into its various components. Vacuum rectification of the tall oil in an anhydrous state has been attempted using conventional apparatus but such attempts have not been very commercially attractive because of the tremendous investment in the apparatus for performing the separation or because of limitations in the apparatus itself. Thus, to effect a separation between the fatty and rosin acid fractions of tall oil requires the fractionating apparatus to include a large number of theoretical plates or a long column of packing due to the closeness of the boiling points of the components of these two fractions. As a result, apparatus built according to conventional design would be extremely large and costly. Further, when distilling in an anhydrous state under vacuum, it is necessary that a very low vacuum be employed in order to avoid excessive heating of the tall oil when vaporizing the same. With a conventional rectification apparatus having sufficient length to anywise approach a satisfactory separation, it may be possible to apply a vacuum of the order of 5 millimeters of mercury or less at the top of the rectification column but due to the pressure drop through the column, the vapor pressure in the reboiler kettle may be 50 millimeters of mercury or greater. It would, therefore, be highly desirable to possess a fractional distillation apparatus on which a high vacuum of the order of 5 millimeters of mercury or less, for example, could be exerted at the overhead condenser for the apparatus with the apparatus constructed and operated in such a manner that only a slightly less vacuum would be applied to the evaporator or kettle and yet there would be provided sufficient rectification (e. g. a sufficient number of theoretical plates or a sufficient number of heights each equivalent to a theoretical plate) to effect the desired separation. Also, such apparatus should be compact and relatively cheap to construct, be flexible in operation and easy to maintain.

Thus, it is a general object of this invention to provide an apparatus having a very low pressure drop across its rectification portion so that a high vacuum can be maintained throughout the apparatus and yet there is provided sufficient rectification to make a desired degree of separation between two closely boiling fractions.

Another object is to provide such an apparatus in which the length of the rectification portions can be made relatively short so that the apparatus is quite compact, simple of construction and economical to build and yet adequate rectification capacity is provided to make a separation between closely boiling materials.

Another object is to provide such an apparatus in which the feed material to be fractionated is not passed through any packed or bubble plate rectification zones per se thereby eliminating loading these zones with liquid which normally will not be vaporized.

Another object of this invention is to provide a rectification apparatus and process in which a portion of the overhead fraction from a relatively short rectification zone is passed to a preceding relatively short rectification zone to provide adequate rectification and to increase the purity of the products obtained and yet the pressure drop across the rectification zones is maintained at a very low figure.

Another object of this invention is to provide a process for the separation of tall oil into fatty acid rich and rosin acid rich fractions through the use of a high vacuum and in the absence of injected open steam in such a manner that said fractions can be produced in substantially any desired degree of purity.

Another object is to provide a process for the production from tall oil of a rosin acid mixture comprising abietic acid, dehydroabietic acid, and dihydroabietic acid (and usually with some tetrahydroabietic acid) in a substantially pure form and substantially devoid of fatty acids and unsaponifiable compounds.

Other objects, advantages, and features of this invention will become more apparent to one skilled in the art upon a consideration of the written specification, the appended claims and the attached drawings wherein:

Fig. 1 is a schematic representation of one embodiment of the rectification apparatus of this invention which also illustrates how the process of this invention may be practiced;

Fig. 2 is an end view, partially in cross-section, of a portion of the apparatus shown in Fig. 1;

Fig. 3 is a view taken along the line 3—3 of Fig. 2 and illustrates details of one embodiment of the evaporator of this invention; and Fig. 4 is a view taken along the line 4—4 of Fig. 3 to further illustrate these details.

Like characters of reference are used throughout the several views to designate like parts.

It is believed the process as well as the products of this invention can be more easily comprehended if the preferred embodiment of the apparatus is first described in some detail and then the process steps described with respect to the specifically illustrated apparatus, although it will be realized that the process can be carried out in apparatus other than that specifically illustrated. Thus, referring to Fig. 1, there is illustrated an evaporating zone defined by evaporator 10 surmounted by a plurality of fractional distillation or rectification zones or columns 11 through 15 which in turn are respectively equipped with overhead condensers 16 through 20. The upper ends of the condensers are each connected to a common vacuum header 21 to which a vacuum can be applied by means of suitable evacuating means 22, such as a jet condenser acting via line 23.

Referring now to Figs. 3 and 4 for additional details of the construction of evaporator 10, it will be noted that it is an elongate substantially horizontal vessel and includes a heating platen as provided by a lower heating surface 25 defined by plate 26. Plate 26 overlies another plate 27 provided with a plurality of longitudinal grooves 28 extending substantially from one end of evaporator 10 to the other. Opposite ends of grooves 28 are respectively in communication, as by ports 29, with heating fluid inlet 30 and heating fluid outlet 31. With this construction, it is possible to fabricate plates 26 of a suitable corrosion resistant material, such as stainless steel, while making plate 27 of ordinary carbon steel or similar. Plate 26 provides surface 25 for heating of the material to be distilled and should any carbonization or fouling of this surface occur, it will be easy to clean merely by removing one or more of end flanges 32 or 33 of the evaporator.

Evaporator 10 is divided into a plurality of vapor compartments by transverse baffle means 34 through 37 spaced apart along the length of the evaporator. Each such baffle means can comprise a plate 38 suitably mounted in the evaporator as by flanges 39 to extend downwardly therein but terminating short of surface 25 so as to permit liquid to flow freely and uninterruptedly along surface 25 from one end of the evaporator to the other and yet to divide the upper portion of the evaporator into a plurality of vapor compartments 40 through 44.

Each of these vapor compartments is provided with an upwardly directed outlet 45 through 49 to communicate between the respective vapor compartments and rectifying towers 11 through 15. Additionally, any reflux liquid from the various rectifying towers is permitted to fall back down through the outlets 45 through 49 back into the same vapor compartments from which the respective vapor fractions were derived to form such reflux liquid. Such reflux liquid can be better distributed in each vapor compartment by providing therein a perforated plate 50 situated above the level of unvaporized liquid in the evaporator.

Towers 11 through 15 comprise rectification zones and preferably are of the packed type so as to provide a minimum pressure drop thereacross. Thus, packing 51 can be supported in each tower by perforated plate 52. As mentioned above, each tower is connected at its upper end to an overhead condenser. Such condenser can be of any suitable type but a finned air-cooled type condenser having a plurality of vertical finned tubes 53 is illustrated (Fig. 2). The condenser includes upper and lower headers 54 and 55, the lower header being connected by an overflow weir pipe 56 to the upper end of the condensers. An overhead product outlet pipe 57 is also connected to lower header 55 and opens thereinto at a level below the upper end of pipe 56. Thus, vapors are free to pass out of the rectifying tower upwardly into the condenser where they are condensed into liquids. These liquids fall back into the lower header 55 and can be permitted to accumulate therein until their level is sufficient to cause them to overflow back down pipe 56 into the rectifying towers to provide liquid reflux therein. The desired overhead product can be withdrawn through pipe 57. Obviously, by regulating valve 58, any desired proportion of the total condensed liquid can be returned to the rectifying tower as reflux.

While only one tower and condenser has been specifically referred to above, it will be understood that all of towers 11 through 15 can be constructed alike. Also, a greater or lesser number of towers than the five illustrated can be employed depending on the degree of rectification desired and the number of fractions to be separated. In any event, it is desirable that the length of any one tower be restricted to be relatively short so as to minimize the pressure differential between evaporator 10 and header 21. As a matter of design, the maximum length of tower to afford the desired maximum pressure differential should be determined and then the number of towers increased as increased rectification or an increased number of product fractions is desired.

A description of the operation of the illustrated embodiment of the apparatus will now be given in conjunction with the description of the process steps. Thus, the material to be fractionated, such as crude tall oil, is fed via pipe 60 into a vacuum drier 61 which can be of conventional construction and have a high vacuum maintained thereon by means of an evacuating system 62. In drier 61, substantially all water and much of the non-condensibles are removed and the resulting dewatered and de-gasified crude tall oil is passed through conduit 62a and pump 63 to a feed pre-heater 64. In this pre-heater, the tall oil can be pre-heated to a temperature approaching that maintained in evaporator 10. Alternatively, the tall oil can be, if desired, pre-heated to a temperature above that in the evaporator so that considerable flashing will occur as it is injected into the evaporator. This would be particularly desirable in case the tall oil feed is very rich in fatty acids or if rectification of the rosin acids is to be emphasized more than that of the fatty acids. In any event, the tall oil is injected into the evaporator through a preselected one of inlets 65 through 68 each of which respectively communicate with vapor compartments 40 through 43. Suppose, for example, the tall oil is injected through inlet 65 into compartment 40. In such event, it will flow along a path longitudinally of the evaporator over heating surface 65 from compartment to compartment to be indirectly heated by means of a countercurrently flowing heating medium passing into the heating platen via inlet conduit 30 and emerging via outlet conduit 31. As the tall oil flows along its path over the heated surface, it is gradually vaporized and in compartment 40 there will be evolved a vapor fraction which is relatively rich in the light ends of the tall oil, namely, fatty acids. As the tall oil continues to flow along its path on heating surface 25, it will undergo continual and gradual vaporization and the vapors in compartments 41 through 44 will be succeedingly richer in the heavy ends of the tall oil, namely, the rosin acids; finally leaving an unvaporized pitch which is withdrawn through outlet 65a. This pitch includes some rosin acids but is primarily the unsaponifiables such as the sterols. The various vapor fractions in the respective compartments pass upwardly through the respective rectifying towers 11 through 15 in intimate countercurrent contact with descending reflux liquid flowing down over the tower packing. Such reflux liquid can be provided by condensation of the vapors in condensers 16 through 20. Of course, some reflux can be provided by condensation of vapor passing upwardly through the towers or their connection with the condensers as by only partially insulating these components so that reflux need not be provided by the condensers per se. Reflux liquid is, of course, free to flow out of the bottom end of the rectifying towers back into the respective compartments from which the vapor fractions were evolved to form such reflux liquid. An overhead product can be withdrawn from one or any number of the overhead condensers via lines 57 through 57d, three-way valves 58 through 58d, and barometric legs 70 through 74. As mentioned above, valves 58 through 58d can be adjusted to regulate the quantity of condensed vapors, if any, returned to the respective rectifying towers to act as reflux therein.

It should perhaps be noted at this point that each of compartments 40 through 44 are of finite length and that there occurs progressive vaporization of the liquid passing through the compartments. Thus, the vapor evolved at the downstream end of a compartment is richer in higher boiling materials tan is the vapor evolved at the upstream end of such compartment. This downstream end vapor when it contacts the liquid at the upstream end of the same compartment will tend to condense with resultant rectification. Also, reflux liquid falling into a compartment from its rectifying tower will also increase the rectification occurring in the evaporator. The evaporator thus is somewhat more efficient than a one-plate still.

In order to secure the desired degree of purity and rectification of any of the vapor fractions, all or any portion of the overhead product from any one of the condensers except first condenser 16 can be passed from such condenser to a preceding vapor compartment. Thus, the overhead fraction passing through conduit 57 can be passed downwardly through three-way valve 75 and conduit 76 to vapor compartment 43 where it again will tend to be vaporized so that the vapors evolved can be again rectified in tower 14. If desired, this overhead fraction from conduit 57 can instead be passed through conduit 77, three-way valve 78 and conduit 79 into compartment 42 so that the condensate can be at least partially re-vaporized for rectification in tower 13 and if there are sufficient heavy ends in such condensate, also in tower 14. Similarly, valve 82 and conduits 80, 81, 83 and 84 are connected to provide suitable manifolding so that if desired, the overhead product from any condenser except the first one can be passed to any preceding vapor compartment. Similarly, the overhead product from two or more towers can be admixed and then distributed in any desired proportion between any one or more of preceding compartments. For example, some or all of the overhead condensate from towers 14 and 15 can be mixed together and then distributed in any desired proportion among compartments 40, 41 and 42. In this manner, a wide range of possible operation is provided which permits an almost infinite variation of the degree of rectification of the original crude tall oil and the fractions to be recovered therefrom. While a detailed description of each of these possible operational modes is not necessary to the disclosure of this invention, one skilled in the art with this disclosure before him can readily visualize the mode best suited to any particular set of conditions.

As a further example of the flexibility of the method and apparatus of this invention, let it be supposed that the tall oil is to have separated from it a fraction of high purity fatty acid. If desired, the crude tall oil can then be fed in through inlet 66 so that there then exists a fraction in compartment 41 which is rich in fatty acids but contains an undesirably high concentration of rosin acid. The resulting reflux from condenser 17 can be passed through conduits 57 and 84 to vapor compartment 40 wherein it is heated to evolve vapor of increased fatty acid concentration. By the time this vapor has been rectified in tower 11, there will result an overhead product in line 57d of greatly increased fatty acid purity. Similarly, if it is found that the fatty acid fraction contains an undesirable concentration of light ends, as well as of the heavier rosin acid, the crude tall oil can be passed into the evaporator through inlet 67 and then the overhead fraction from tower 13, which is of undesirably high concentration of rosin acid and light ends, can be passed through conduits 57b, 81 and 84 into vapor compartment 40. The overhead product from rectification tower 11 will then contain the undesired light ends while an unvaporized fatty acid fraction is free to flow along heating surface 25 into compartment 41 wherein a fraction of increased richness in fatty acids can be vaporized to be rectified in tower 12 to produce an overhead in conduit 57c which has been substantially denuded of light ends in tower 11 and of the heavier rosin acids in tower 12.

It will be realized that it is not essential that the crude tall oil be fed into a compartment other than a first one in order to produce a pure fatty acid fraction but that such opertaion will be advantageous under certain circumstances. Similarly, fractions relatively rich in rosin acids can be produced by manipulation of the apparatus in a similar manner taking into account the difference in boiling points between the fatty acids and the rosin acids. Thus, suppose it is desirable to produce a rosin acid fraction of high purity. The tall oil feed can be introduced into vapor compartment 40 and a considerable amount of overhead product from condenser 20 as well as condensers 19 and 18, if desired, returned to preceding compartments to cause further denudation of the lighter fatty acid components therefrom. In this manner, the tall oil flowing through the evaporator can be vaporized and rectified any number of desired times so as to strip it of the lighter components to any desired extent consistent with the capacity of the particular equipment being employed.

As a further example of the process of this invention, it has been found possible to commercially produce a rosin acid fraction substantially devoid of fatty acids and unsaponifiables and having an increased dehydoabietic and dihydroabietic acid content as compared with the rosin acid fraction in the tall oil feed. Thus, the tall oil feed is maintained concomitant with its vaporization and rectification at a temperature within the range of 400° to 600° F., preferably 500° to 600° F., during a substantial proportion of the time the tall oil is resident in the evaporator and is being fractionated so that there occurs a substantial disproportionation of Steele's abietic acid ($C_{20}H_{30}O_2$) into dehydroabetic acid ($C_{20}H_{28}O_2$) and dihydroabietc acid ($C_{20}H_{32}O_2$). Also, it has been found that a not inconsiderable amount of tetrahydroabietic acid is also present. This fraction of disproportionated rosin acid can be withdrawn as from condenser 20 via conduit 57 and leg 70 and upon being so withdrawn, will exist in the form of a liquid until it is further cooled. Upon so being cooled, crystals of rosin acid (the various abietic acids) will form in a mother liquor comprising fatty acid and possibly some unsaponifiables. After the crystals are formed, they can be separated from the mother liquor to produce a substantially pure fraction of rosin acid including therein the various abietic acids. Such separation can be obtained by centrifuging the mother liquor-crystal fraction followed by washing of the crystals with a selective solvent for the fatty acid such as methanol or water, the latter preferably being heated and containing a minor proportion (e. g. ¼ of 1 per cent by weight) of detergent, such as a rosin base detergent. The resulting rosin acid crystals are substantially white, granular, free-flowing, and dry to the touch, and have been found to be of the following typical composition:

| | Percent |
|---|---|
| Total rosin acid | 99+ |
| Dehydroabietic acid | 30 |
| Dihydro and tetrahydroabietic acids | 20 |
| Abietic acid | 40 |
| Other abietic acid types (by difference) | 10 |
| Fatty acid | 0 |
| Unsaponifiables | less than 1 |

The crystallization of the above abietic acids from the mother liquor has been found to be of improved character when the liquor is maintained at a temperature within the range of 100° to 150° F., preferably about 135° F., for a considerable period of time, say two to eight days. The temperature employed should be above room temperature (70° F.) because crystals formed at such temperature tend to be small and to give the mother liquor a cloudy appearance. However, as the temperature is raised, the solubility of the abietic acids in the mother liquor increases with resultant decrease in recovery. The amount of time will be dependent upon the desired extent of recovery of crystals and it has been found that at about 135° F., further crystallization will not occur when the total abietic acid content of the mother liquor reaches a minimum of about 30% abietic acid (at about 4 days time). It has also been found that homogenization, as by passing through a conventional homogenizer at 1500 p. s. i. differential, of the abietic acid fraction prior to crystallization causes the crystals to grow at a more rapid rate than when such fraction is not homogenized. The mother liquor can be decanted from the crystals and then the crystals further purified as above indicated. The resulting crystals (having a typical composition as set forth in the above table) are of a very high melting point and have a titer range of 308–312° F. They have an acid number of 185–186 indicating a molecular weight of about 302, the molecular weight of Steele's abietic acid. It is thought that the elevated melting point is due to a large extent to the increased dehydroabietic acid content.

The feed material applicable to the process and apparatus of this invention is preferably crude or partially refined tall oil although other oils such as cottonseed oil, soy bean oil, et cetera, can be similarly fractionated. The temperature at which the various portions of the apparatus is maintained will be largely dependent upon the characteristics of the material being fractionated and can be readily determined by those skilled in the art. When tall oil is being treated, it is preferred that a substantial proportion of the evaporator and the rectifying towers be maintained at a temperature as high as possible within the range of 400° to 600° F. in order to emphasize the disproportionation reaction taking place therein. However, it has been found that a temperature materially in excess of 600° F. will result in undesirable thermal decomposition (such as decarboxylation) of the rosin acids of the tall oil. The residence time of the tall oil in the evaporator 10 and towers 11 through 15 should also be as long as possible to aid in the disproportionation and in apparatus constructed in accordance with the drawings, a residence time of about 20 minutes yields a disproportionated rosin acid product of a typical composition as set forth in the above table. Residence times of at least 5 and preferably 10 minutes are recommended.

The pressure to be used in the apparatus of this invention will likewise be dependent upon the nature of the material being farctionated and also upon the desired temperature in the evaporator. In fractionating tall oil, it has been found that a pressure of less than 15, and preferably less than 5, millimeters of mercury in header 21 is perferable. In this connection, it will be noticed that condenser 16 can be constructed so that there exists a substantially small pressure drop thereacross. Thus, with the finned tube type of condenser, condensation takes place on the walls of the tube leaving a free inner passageway for the application of vacuum to the respective rectification towers. Preferably these towers are of the packed type since such type of tower has a lower pressure drop thereacross than the bubble plate type. In any event, the towers are made to be relatively short so that a minimum pressure differential will exist between header 21 and evaporator 10 and yet through the return of overhead products to preceding vapor compartments as outlined above, substantially any desired degree of rectification can be achieved in the apparatus. Also, the various rectification towers are not loaded up with unvaporized feed as would be the case if the feed were fed directly into the towers as is conventional practice. Instead, the towers receive only those vapors which are to be rectified therein and the unvaporized feed flows along heated surface 25 where it cannot either flood the towers or cause increased pressure drop thereacross. In this manner, the various fractions of the material being fractionated are vaporized only at the points where it is desired to withdraw them so that they can be rectified.

The extent of vaporization in the various vapor compartments of the various components of the feed liquid being fractionated can be controlled by varying one or all of the pre-heat of and feed rate of the material to be fractionated, the temperature and flow rate of the heating medium through the heating platen and the rate of overhead product draw-off from the various rectifying towers as well as its rate of introduction into a preceding compartment. Thus, if too much vaporization of higher boiling components is occurring in a compartment, the reflux ratio on the tower serving that compartment can be increased to dilute further the liquid in such compartment with relatively easily vaporizable material thereby decreasing the amount of higher boiling components which will be vaporized (i. e. absorbing more of the vaporization capacity of a compartment in the vaporization of lower boiling components). Also, such increased return of reflux to a compartment decreases the residence time of the higher boiling components and of the liquid in the compartment so that there is provided less time for the liquid composition to be changed as much as when a longer residence time is employed (assuming heat input to be constant, less of the higher boiling components will be vaporized). By the same token, increasing the rate of injection into a compartment of overhead product from a succeeding tower will decrease the residence time of unvaporized feed liquid passing into and through such compartment. As to what extent such injection will change the composition of the vapor in the compartment will depend upon the composition of the injected overhead product, as well as that of feed liquid passing through the compartment and that of the reflux liquid falling into the compartment. By manipulation of the flow rates of these various streams as well as the heat input rate, it is possible to adjust the vapor composition in each compartment as well as the extent of vaporization of the feed liquid in each compartment. This again points up the flexibility of operation of the apparatus of this invention as well as that of the process.

While the above description has given only exemplary modes of manipulation and operation of the apparatus and process, it will be apparent that such description is not nor is it intended to be exhaustive of the possibilities since enumeration of every mode of operation would render the description unduly prolix and would not materially aid in the understanding of the invention. Also, it is contemplated that a portion of the overhead product from any one or more of towers 11 through 15 can be returned directly to the vapor compartment serving that tower for its dilution effect; obviously, however, the return rate should not be so large as to render a tower inoperative in its rectifying function.

From the foregoing it will be seen that this invention is one well adapted to attain all of the ends and objects hereinabove set forth, together with other advantages which are obvious and which are inherent to the apparatus and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the acompanying drawings is to be interpreted as illustrative and not in a limiting sense.

The invention having been described, what is claimed is:

1. A process for fractionally distilling a tall oil feed into fractions respectively rich in fatty acids and in rosin acids which comprises continuously passing the tall oil along an elongate path in an evaporating zone, heating said evaporating zone to gradually raise the temperature of unvaporized tall oil components flowing therethrough, said heating being sufficient to cause vaporization of fatty acids at one end of the evaporating zone with increasing vaporization of rosin acids as the unvaporized tall oil components flow toward the other end of the evaporating zone, segregating vapors generated in said evaporating zone into a plurality of vaporous fractions each derived from a different section of said evaporating zone while permitting unvaporized tall oil components to continue flowing through the evaporating zone and along said path, individually rectifying said vaporous fractions in a plurality of separate rectifying zones while permitting liquid reflux from each such rectifying zone to flow into the evaporating zone at the section thereof from whence the vaporous fractions for the respective rectifying zones were derived, applying a vacuum to the upper end of each of said rectifying zones, passing an overhead product from at least one of said rectifying zones to a section of the evaporating zone upstream of that section where the vaporous fraction resulting in such overhead product was derived, and recovering said rich fatty acid and rosin acid fractions as products of the process by withdrawing them as overhead products respectively from succeeding ones of said rectifying zones.

2. The process of claim 1 wherein said tall oil feed is fed into said evaporating zone at a section thereof downstream from the first section and wherein an overhead product from a rectifying zone rectifying a vaporous fraction derived from a section downstream from said first section is fed into said first section to produce an overhead product rich in fatty acids.

3. A process for fractionally distilling a tall oil feed into fractions respectively rich in fatty acids and in rosin acids which comprises continuously passing the tall oil along an elongate path in an evaporating zone, heating said evaporating zone to gradually raise the temperature of unvaporized tall oil components flowing therethrough, said heating being sufficient to cause vaporization of fatty acids at one end of the evaporating zone with increasing vaporization of rosin acids as the unvaporized tall oil components flow toward the other end of the evaporating zone, segregating vapors generated in said evaporating zone into a plurality of vaporous fractions each derived from a different section of said evaporating zone while permitting unvaporized tall oil components to continue flowing through the evaporating zone and along said path, individually rectifying said vaporous fractions in a plurality of separate rectifying zones while permitting liquid reflux from each such rectifying zone to flow into the evaporating zone at the section thereof from whence the vaporous fractions for the respective rectifying zones were derived, applying a vacuum to the upper end of each of said rectifying zones, and recovering said rich fatty acid and rosin acid fractions as products of the process by withdrawing them as overhead products respectively from succeeding ones of said rectifying zones.

4. A process for producing from tall oil a crystalline product comprising a mixture of abietic, dehydroabietic and dihydroabietic acids substantially devoid of fatty acids and unsaponifiable compounds which comprises, passing said tall oil continuously along a path in an evaporating zone, heating said tall oil sufficiently to gradually vaporize the same as it passes along said path and to establish a temperature gradient along said path whereby vapors rich in fatty acids are evolved along an initial portion of the path and vapors of increasing richness in rosin acids are evolved as the tall oil flows further along said path, the temperature of the tall oil along a substantial portion of said path being maintained within the range of 400° to 600° F. for a period of time sufficient to convert a substantial portion of the abietic acid in said tall oil to dehydro- and dihydroabietic acids, withdrawing separate fractions of said vapors at preselected points spaced along said path, separately rectifying said fractions in a plurality of individual rectifying zones while permitting reflux liquid from said rectifying zones to return to said evaporating zone respectively at said points where said fractions are withdrawn, maintaining a vacuum of less than 15 millimeters mercury at the upper ends of each of said rectifying zones, withdrawing an overhead product from one of said rectifying zones rectifying vapors withdrawn from one of said points remote from said initial portion of said path, withdrawing pitch from said evaporating zone near the terminus of said path, cooling said overhead product to cause crystals of abietic, dehydroabietic and dihydroabietic acid to form therein, and removing uncrystallized liquor from the resulting crystals to recover said crystalline product.

5. The process of claim 4 wherein said overhead product it withdrawn from a rectifying zone rectifying a vaporous fraction withdrawn from a point along said path which is adjacent the terminus of the path.

6. The process of claim 4 wherein a portion of said overhead product is returned from the last-mentioned rectifying zone to said evaporating zone at one of said points upstream of the point where the vaporous fraction is withdrawn from said evaporating zone for rectification in said last-mentioned rectifying zone.

7. A fractional distillation apparatus particularly adapted for the high vacuum distillation of tall oil which comprises, in combination, an elongate substantially horizontal evaporator vessel, heating means disposed in the lower portion of said vessel to heat liquid flowing through the vessel, a plurality of transverse baffle means spaced apart along the length of and extending downwardly in said vessel but terminating short of the lower portion thereof to divide the vessel into a plurality of vapor compartments and yet permitting liquid to flow freely and uninterruptedly along the heating means in said vessel, means for introducing liquid to be fractionated into one of said compartments, means for removing unvaporized liquid from another compartment, upwardly displaced outlets one from each of said compartments, vapor-liquid contact devices each connected through one of said outlets to a compartment to respectively receive vapors to be fractionated from said compartments and to return liquid bottoms from the devices to the respective compartments to which such devices are connected, means for separately condensing vapors derived from an upper portion of said devices and returning at least a portion of the resulting condensed vapors as reflux to the one of said devices from which the vapors were derived, means for passing another portion of such condensed vapors to a compartment having a device connected thereto other than the one from which the condensed vapors were derived, and evacuating means connected to each of said devices to create a substantial vacuum therein as well as in said vessel.

8. The apparatus of claim 7 wherein said contact devices each comprise a packed tower connected directly to said vessel.

9. A fractional distillation apparatus particularly adapted for the high vacuum distillation of tall oil which comprises, in combination, an elongate substantially horizontal evaporator vessel, a plurality of transverse baffle means dividing the upper portion of the vessel into a plurality of vapor compartments but terminating short of the lower portion of the vessel so that liquid can flow freely along the bottom of the vessel from one compartment to another, heating means disposed along the bottom of the vessel to heat said liquid flowing from one compartment to another, means for introducing material to be fractionated into one compartment, outlet means for removing unvaporized heavy ends of the liquid from another compartment, vapor-liquid contact devices each having its lower portion connected to one of said compartments whereby vapors flow upwardly into one of such devices and liquid from the devices flows downwardly into the one of said compartments to which the respective device is connected, separate condensing means each connected to an upper portion of one of said devices to condense vapors from the respective devices and then return a portion of the condensed vapors as reflux liquid to the device from which the vapors were derived, means for passing another portion of the condensed vapors from one of said condensing means to a compartment upstream of both the compartment to which is connected the device from which the condensed vapors were derived and the compartment to which said outlet means is connected, and evacuation means connected to said devices to cause a high vacuum to exist in said devices and in said vessel.

10. The apparatus of claim 9 wherein said heating means comprises a substantially horizontal flat surface disposed across a substantial part of the lower portion of said vessel whereby a relatively shallow depth of liquid can be maintained thereon as the liquid flows from one compartment to the other.

11. The apparatus of claim 9 wherein said means for passing said another portion of the condensed vapors includes a connection between one condensing means and a compartment which is situated at least two compartments upstream of the compartment connected to the device from which the condensed vapors were derived.

12. A fractional distillation apparatus particularly adapted for use under high vacuum which comprises, in combination, an elongate substantially horizontal evaporator vessel, a plurality of transverse baffle means dividing the upper portion of the vessel into a plurality of succeeding vapor compartments but terminating short of the bottom of the vessel, the lower portion of the vessel below said baffle means being substantially unobstructed to liquid flowing longitudinally along the vessel so that such liquid can flow freely and uninterruptedly along the bottom of the vessel from one compartment to another, heating means disposed in each compartment adjacent the bottom thereof to heat said liquid flowing from one compartment to another, means for introducing material to be fractionated directly into a compartment preceding the last compartment, outlet means for withdrawing unvaporized liquid from said last compartment, a plurality of vapor-liquid contact towers one for each compartment, said towers having their lower portions respectively opening into an upper part of one of said compartments so that vapor can flow from a compartment into a tower and liquid can flow from a lower portion of a tower into a compartment, vapor condensers each connected to an upper portion of one of the towers to condense vapors passing from the compartments through the respective towers, means for passing a portion of the condensed vapors as liquid reflux from a condenser back to the tower to which such condenser is connected, means for passing a portion of condensed vapor from a first condenser connected to a first tower opening into a first compartment into a second compartment, said second compartment preceding said first compartment, evacuating means connected to each of said condensers, and means for withdrawing a portion of condensed vapors as an overhead product from said condensers.

13. A fractional distillation apparatus particularly adapted for use under high vacuum which comprises, in combination, an evaporating means divided into a plurality of individual evaporating chambers connected in series for flow of liquid to succeeding ones of said chambers but substantially limiting vapor flow therebetween, a plurality of rectification columns each connected at a lower portion thereof to one of said chambers so that vapors can pass upwardly from each of the chambers into the respective columns and so that reflux liquid can flow from said columns into the respective ones of said chambers to which the columns are connected, heating means for each chamber, a plurality of overhead vapor condensing means each connected to one column and each including a connection for passing a portion of condensed vapors from each such condensing means back to the column to which the respective condensing means is connected, and conduit means for conducting a portion of condensed vapors from one of the condensing means to a preceding chamber in said series.

14. A fractional distillation apparatus particularly adapted for use under high vacuum which comprises, in combination, a plurality of separate rectification columns connected to lower evaporating chambers respectively, one such chamber being provided for each such column, heating means for each of such chambers adapted to vaporize liquid in the chambers, said chambers being connected for series flow of liquid therethrough while substantially limiting vapor flow therebetween, a plurality of means for individually condensing overhead vapors from each of said columns and returning a portion of such condensed vapors back to the column from whence the vapors were derived to act as reflux therein, means for passing a portion of the overhead vapors from one of said columns to one of said lower evaporating chambers, said one chamber to which the overhead vapors are so passed being upstream of the chamber of the column from which the vapors so passed are derived, and means for applying a vacuum to each of said condensing means.

15. A fractional distillation apparatus particularly adapted for use under high vacuum which comprises, in combination, an elongate substantially horizontal evaporator vessel, heating means extending the length of the vessel and including a flat plate-like heating surface defining the lower portion of the vessel, said vessel being provided with upwardly directed openings therein spaced apart along the length of the vessel, transverse baffle means situated in the vessel intermediate said openings and extending downwardly but terminating above said heating surface so as to divide the vessel into a plurality of vapor compartments while permitting uninterrupted flow of liquid along said surface from one compartment to another, an outlet for withdrawing unvaporized heavy ends from the last of said compartments, an inlet for introducing material to be fractionated into a compartment upstream of the last compartment, a plurality of vertical packed rectification towers each communicating at its lower end with the vessel through the respective ones of said openings, a condenser connected to the upper end of each such tower to individually condense overhead vapors from the towers, evacuating means connected to each of said condensers, conduit means connecting each condenser except the one serving the tower communicating with the first chamber directly to a chamber preceding the one communicating with the tower which a particular condenser is serving, and conduit means for withdrawing an overhead product from at least one of said towers.

16. The apparatus of claim 15 wherein means are provided selectively connecting each condenser except the one serving the tower communicating with the first chamber to all chambers in said vessel upstream of the chamber communicating with the tower which any particular condenser is serving whereby condensed vapors can be passed to any one of a preceding chamber in the vessel for refractionation.

17. A fractional distillation apparatus particularly adapted for use under high vacuum which comprises, in combination, an elongate substantially horizontal evaporator vessel, heating means in the lower portion of the vessel, said vessel being provided with upwardly directed openings therein spaced apart along the length of the vessel, transverse baffle means situated in the vessel intermediate said openings and extending downwardly but terminating above the bottom of the vessel so as to divide the vessel into a plurality of vapor compartments while permitting flow of liquid along said vessel from one compartment to another, an outlet for withdrawing unvaporized heavy ends from the last of said compartments, an inlet for introducing material to be fractionated into a compartment upstream of the last compartment, a plurality of vertical rectification towers each communicating at its lower end with the vessel through the respective ones of said openings, a condenser connected to the upper end of such towers to condense overhead vapors from the towers, evacuating means connected to said condensers, and conduit means for withdrawing an overhead product from at least one of said towers.

References Cited in the file of this patent

UNITED STATES PATENTS

| | | |
|---|---|---|
| 1,081,949 | Du Pont | Dec. 23, 1913 |
| 1,655,603 | Hanna | Jan. 10, 1928 |
| 1,826,224 | Schultze | Oct. 6, 1931 |
| 1,903,573 | Schultze | Apr. 11, 1933 |
| 2,443,970 | Waddill | June 22, 1948 |

FOREIGN PATENTS

| | | |
|---|---|---|
| 50,508 | Netherlands | June 16, 1941 |

OTHER REFERENCES

JACS, vol. 60, pp. 921–25 (1938).